(12) United States Patent
Takashima

(10) Patent No.: US 7,262,524 B2
(45) Date of Patent: Aug. 28, 2007

(54) BEARING ASSEMBLY, STAGE DEVICE USING SAME, AND EXPOSURE APPARATUS USING SAME

(75) Inventor: Tsuneo Takashima, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/214,752

(22) Filed: Aug. 31, 2005

(65) Prior Publication Data

US 2006/0033391 A1    Feb. 16, 2006

Related U.S. Application Data

(62) Division of application No. 10/676,091, filed on Oct. 2, 2003.

(30) Foreign Application Priority Data

Oct. 9, 2002    (JP)    ............... 2002-296302

(51) Int. Cl.
*H02K 7/09*    (2006.01)

(52) U.S. Cl. ...................... 310/12; 310/90.5

(58) Field of Classification Search .............. 310/90.5, 310/90, 12–14; 104/46, 48–50, 28
See application file for complete search history.

(56) References Cited

U.S. PATENT DOCUMENTS

| | | | | |
|---|---|---|---|---|
| 3,125,964 A * | 3/1964 | Silverman | ...................... | 104/89 |
| 3,845,720 A | 11/1974 | Bohn et al. | .......... | 104/148 MS |
| 5,140,208 A | 8/1992 | Tozoni | ...................... | 310/90.5 |
| 5,196,745 A | 3/1993 | Trumper | ...................... | 310/12 |
| 5,319,275 A | 6/1994 | Tozoni | ...................... | 310/90.5 |
| 5,332,977 A | 7/1994 | Fritsche et al. | ............. | 330/297 |
| 5,619,083 A | 4/1997 | Dunfield et al. | ........... | 310/90.5 |
| 5,780,943 A | 7/1998 | Ono | ............. | 310/12 |
| 5,825,105 A * | 10/1998 | Barber et al. | ................. | 310/12 |
| 6,040,675 A | 3/2000 | Ono | ............. | 318/649 |
| 6,101,952 A | 8/2000 | Thornton et al. | ........... | 104/282 |
| 6,151,100 A | 11/2000 | Yamane et al. | ................ | 355/53 |
| 6,184,596 B1 | 2/2001 | Ohzeki | ........................ | 310/12 |
| 6,266,133 B1 | 7/2001 | Miyajima et al. | ............. | 355/72 |
| 6,271,606 B1 * | 8/2001 | Hazelton | ..................... | 310/12 |
| 6,583,859 B2 | 6/2003 | Miyajima et al. | ............. | 355/72 |
| 6,674,085 B2 * | 1/2004 | Miura et al. | ........... | 250/442.11 |
| 7,084,538 B2 * | 8/2006 | Takashima | ................. | 310/90.5 |

FOREIGN PATENT DOCUMENTS

| | | |
|---|---|---|
| JP | 61-290231 | 12/1986 |
| JP | 63-20014 | 4/1988 |
| JP | 6-6248 | 1/1994 |
| JP | 2573502 | 10/1996 |

* cited by examiner

*Primary Examiner*—Dang Le
(74) *Attorney, Agent, or Firm*—Fitzpatrick, Cella, Harper & Scinto

(57) ABSTRACT

A stage apparatus includes a guide provided with a surface including a magnetic body, a moving body movable along the surface, a gas bearing for supporting the moving body with respect to the surface, and a magnet which is supplied to the moving body and produces a magnetic attractive force with the magnetic body. The surface of the guide has edges to define its size in a width direction, which is orthogonal to a traveling direction of the moving body to limit movement of the moving body in the width direction, using a magnetic attractive force of the magnet in a direction parallel to the surface, and to apply pre-pressure to the gas bearing.

5 Claims, 10 Drawing Sheets

BEARING ASSEMBLY, STAGE DEVICE USING SAME, AND EXPOSURE APPARATUS USING SAME

This application is a divisional application of copending U.S. patent application Ser. No. 10/676,091, filed Oct. 2, 2003.

FIELD OF THE INVENTION

This invention relates to a bearing assembly that has a hydrostatic bearing and is ideal for use in an exposure apparatus, which is used in high-precision machining, such as semiconductor lithography, or in a machine tool or measurement equipment, to a stage device that uses this bearing assembly, and to an exposure apparatus that uses the stage device.

BACKGROUND OF THE INVENTION

In general, the following two types of exposure apparatuses are typical exposure apparatuses used in the manufacture of semiconductor devices and the like: a step-and-repeat exposure apparatus (also referred to as a "stepper") in which, while a substrate (wafer or glass plate) is moved step by step, a plurality of exposure areas on the substrate are successively exposed to a pattern on a master plate (a reticle or mask) via a projection optical system, and a step-and-scan exposure apparatus (also referred to as a scanner) in which exposure transfer of a pattern to a plurality of areas on a substrate is repeated by repeating stepping motion and scanning exposure.

These exposure apparatuses are equipped with stage devices (a wafer stage and a reticle stage) for positioning a wafer or a reticle by moving it at a high speed. The general structure of such a stage device is illustrated in the specifications of Japanese Patent Publication No. 63-20014 and 6-6248, by way of example. The basic structure of a stage device of this kind will be described with reference to FIGS. 8A and 8B.

FIG. 8A is a plan view illustrating the basic structure of an ordinary stage device, and FIG. 8B is a sectional view of the same. The stage device shown in FIGS. 8A and 8B includes a moving table 1; an X linear-motor movable element 2 for driving the moving table 1 along the X direction; an X linear-motor stator 3 for driving the moving table 1 along the X direction; a Y linear-motor movable element 4 for driving the moving table 1 along the Y direction; a Y linear-motor stator 5 for driving the moving table 1 along the Y direction; a stage base 6, the upper surface of which serves as a guide surface for the moving table 1; a hydrostatic bearing 7 for levitating the moving table 1 a prescribed amount above the stage base 6; an X movable guide 8 for moving the moving table 1 along the X direction; a Y movable guide 9 for moving the moving table 1 along the Y direction; an X stationary guide 10 for guiding the X movable guide 8; and a Y stationary guide 11 for guiding the Y movable guide 9.

The X movable guide 8 in the above arrangement is moved along the X direction, while being guided directly by the X stationary guide 10, by thrust produced by the X linear motors 2 and 3. With movement of the X movable guide 8, the moving table 1 is moved the same amount along the X direction. Operation along the Y direction is similar. Thus, the moving table 1 is capable of being driven along the X and Y directions. Further, though the structural details of the stationary guide differ in each of the specifications of Japanese Patent Publication No. 63-20014 and No. 6-6248, both are the same in that a stationary guide is provided as a guide for driving the movable guide.

As mentioned above, the ordinary stage device requires a dual guide structure, namely, the movable and stationary guides. In the case of an arrangement in which the stationary guides have been removed, the X movable guide will be unstable in the direction perpendicular to the thrust of the X linear motor, i.e., along the Y axis, and in the direction of rotation about the Z axis perpendicular to the plane of the stage base. Even if control is performed based upon thrust allocation of the two X linear motors with regard to the direction of rotation about the Z axis, the position along the Y axis will still be unstable. This means that the X stationary guide cannot be omitted. The same is true with regard to the Y stationary guide.

Thus, as set forth above, the conventional stage device is such that the stationary guides, namely, two guide mechanisms, are required. A problem which arises is that these must be adjusted in highly reliable fashion. In addition, the apparatus is large in size and high in cost.

SUMMARY OF THE INVENTION

It is desired that adjustment complexity be eliminated and cost lowered in the above-described prior art by providing a bearing assembly that does not require stationary guides.

According to the present invention, the foregoing object is attained by providing a bearing assembly comprising a guide having a top side provided with a guide surface comprising a magnetic body, a bearing provided on a portion of a moving body that opposes the guide surface for the purpose of levitating the moving body above the guide surface, the moving body moving along the guide surface, and a magnet, which has an opposing surface that opposes the guide surface, provided on the moving body for the purpose of applying a magnetic attractive force between the moving body and the guide surface, wherein a relationship between the guide surface and the size and/or placement of the opposing surface of the magnet is defined for the purpose of limiting displacement of the moving body in a width direction, which is orthogonal to the traveling direction of the moving body, to an allowable range, using a magnetic attractive force in the width direction produced in accordance with an amount of deviation of the opposing surface of the magnet from the guide surface owing to displacement, which can occur when the moving body moves along the guide surface, parallel to the guide surface and in the width direction.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENT

Preferred embodiments of the present invention will now be described in detail in accordance with the accompanying drawings.

In general, hydrostatic bearings of heightened rigidity obtained by prestressing using permanent magnets, as illustrated in the specifications of Japanese Patent Application Laid-Open No. 61-290231 and Japanese Patent No. 2573502, are used widely as guides employed in a stage device described above in connection with the prior art. These hydrostatic bearings include a guide comprising a magnetic body, a moving body that moves along this guide, a hydrostatic bearing provided at portions opposing the guide and moving body, and a permanent magnet provided on the moving body in such a manner that the guide and moving body will be attracted in the direction perpendicular to the guide surface by a predetermined magnetic force.

The performance magnet provided in order to apply the prestressing usually produces an attractive force only along the direction perpendicular to the guide surface. However, a feature of this arrangement is that if part of the permanent magnet deviates from the range of movement along the opposing guide surface, a restoration force parallel to the guide surface is produced and restores the permanent magnet to a prescribed position. The present invention focuses upon this feature. Specifically, the arrangement is such that displacement of the moving body in a direction parallel to the guide surface is limited utilizing the generation of an attractive force, which is parallel to the guide surface, by the permanent magnet.

Though the details will be described below, an arrangement in which a guide area is restricted by means such as a groove provided in the guide, thereby making the guide area substantially agree with or smaller than the range of movement of a magnet, is adopted as one mode for utilizing a restoration force in a direction parallel to the guide surface. As a result, in a case in which the position of the moving body deviates from the range of movement, the magnetic attractive force of the permanent magnet acts in a direction parallel to the guide surface so that the displacement of the moving body in the direction parallel to the guide surface is limited. This arrangement makes it possible to dispense with the stationary guides necessary in the prior art.

First Embodiment

Figure 1A:
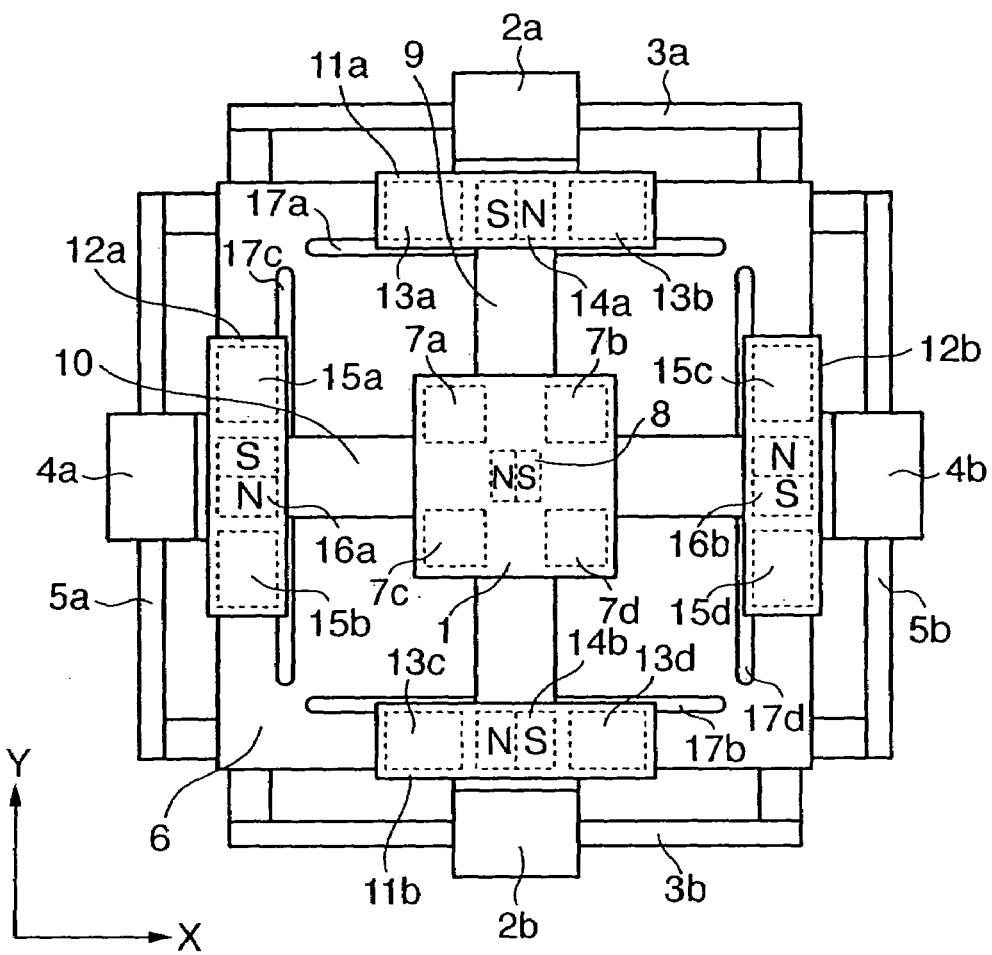
FIGS. 1A and 1B are diagrams illustrating the structure of a stage device according to a first embodiment of the present invention.
Figure 1B:
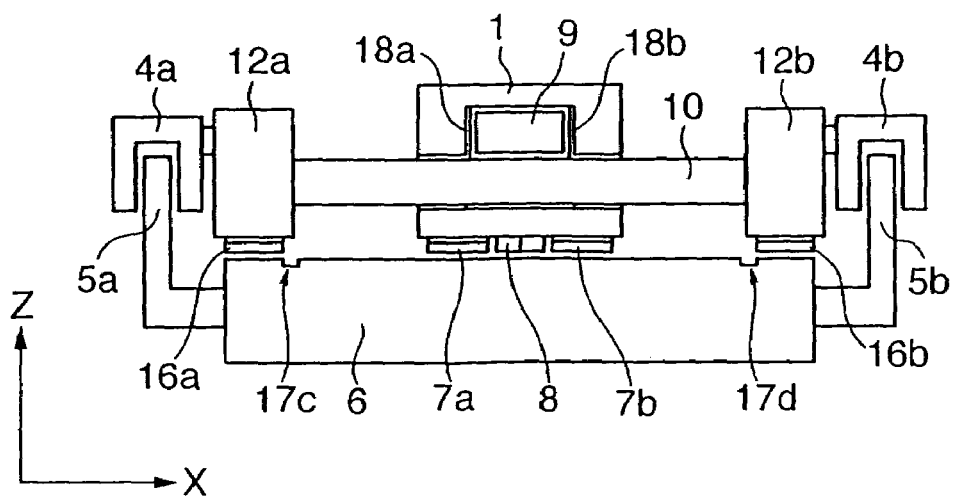

FIGS. 1A and 1B are diagrams illustrating a stage device according to a first embodiment of the present invention, in which FIG. 1A is a plan view and FIG. 1B a sectional view.

As shown in FIGS. 1A and 1B, the stage device includes the moving table 1 that moves along the X and Y directions, X linear-motor movable elements 2a, 2b for moving the moving table 1 along the X direction, X linear-motor stators 3a, 3b for moving the moving table 1 along the X direction, Y linear-motor movable elements 4a, 4b for moving the table 1 along the Y direction, Y linear-motor stators 5a, 5b for moving the moving table 1 along the Y direction, the stage base 6, the upper surface of which serves as a guide surface for the moving table 1, XY air pads 7a, 7b, 7c, 7d for levitating the moving table 1 a prescribed amount above the stage base 6, and an XY pressurizing magnet 8 for applying predetermined prestress to the XY air pads 7a, 7b, 7c, 7d.

The stage device further includes an X guide 9 driven by the X linear motors (2a, 3a, 2b, 3b) to transmit thrust to the moving table 1, a Y guide 10 driven by the linear motors (4a, 5a, 4b, 5b) to transmit thrust to the moving table 1, X sliders 11a, 11b for supporting the X guide 9, Y sliders 12a, 12b for supporting the Y guide 10, X air pads 13a, 13b, 13c, 13d for levitating the X sliders 11a, 11b a prescribed amount above the stage base 6, X pressurizing magnets 14a, 14b for applying predetermined prestress to the X air pads 13a, 13b, 13c, 13d, Y air pads 15a, 15b, 15c, 15d for levitating the Y sliders 12a, 12b a prescribed amount above the stage base 6, and Y pressurizing magnets 16a, 16b for applying predetermined prestress to the Y air pads 15a, 15b, 15c, 15d. The stage base 6 is provided with grooves 17a, 17b, 17c, 17d. X transverse air pads 18a, 18b are provided on the moving table 1 so as to oppose the X guide 9. Similarly, Y transverse air pads (not shown) are provided on the moving table 1 so as to oppose the Y guide 10.

The moving table 1 is supported out of contact with the stage base 6 by the XY air pads 7a, 7b, 7c, 7d, and is simultaneously supported out of contact with the X guide 9 and Y guide 10 by the X transverse air pads 18a, 18b opposing the X guide 9 and the Y transverse air pads (not shown) opposing the Y guide 10. Further, the X guide 9 and the X sliders 13a, 13b situated at both ends of the X guide 9 are supported out of contact with the stage base 6 by the X air pads 13a, 13b. As a result, when the X linear motors 2a, 2b, 3a, 3b produce a predetermined thrust, the X guide 9 is moved along the X axis in FIGS. 1A and 1B while being guided on the top surface of the stage base 6, and this is accompanied by movement of the moving table 1 along the X axis while being guided on the top surface of the stage base 6 and on both side surfaces of the Y guide 10. Similarly, when the Y linear motors 4a, 4b, 5a, 5b produce a predetermined thrust, the Y guide 10 is moved along the Y axis in FIGS. 1A and 1B while being guided on the top surface of the stage base 6, and this is accompanied by movement of the moving table 1 along the Y axis while being guided on the top surface of the stage base 6 and on both side surfaces of the X guide 9. Accordingly, the moving table 1 can be moved along any direction in the XY plane by this arrangement.

The XY coordinates of the moving table 1 and its angle of rotation about the Z axis can be found by measuring the position of a moving mirror (not shown), which is provided on the moving table 1, by a plurality of interferometers (not shown), or by measuring the positions of moving mirrors (not shown) provided on the X guide 9, Y guide 10, or on the X sliders 11a, 11b and Y sliders 12a, 12b, by a plurality of laser interferometers, and it is possible to uniquely decide and control the movement and position of the moving table 1 in terms of the XY coordinates and angle about the Z axis based upon these measurements.

In this case, the X coordinate of the X guide 9 (and of the X sliders 11a, 11b secured to the both ends thereof) and the angle of rotation thereof about the Z axis are the same as those of the moving table 1 and, therefore, are uniquely determined. However, displacement of the Y coordinate, i.e., along the longitudinal direction, is not determined. Similarly, the Y coordinate of the Y guide 10 (and of the Y sliders 12a, 12b secured to both ends thereof) and the angle of rotation thereof about the Z axis are uniquely determined. However, displacement of the X coordinate, i.e., along the longitudinal direction, is not determined. Consequently, the X guide 9 and Y guide 10 require a direct-acting guide of some kind to limit displacement along the longitudinal direction. That is why the conventional stage described above requires stationary guides in addition to moving guides.

The first embodiment provides the top side of the stage base 6 with grooves 17a, 17b, 17c, 17d, whereby displacement of the X guide 9 and Y guide 10 in the longitudinal direction can be limited without the provision of stationary guide members.

As shown in FIG. 1B, the bottom sides of the Y sliders 12a, 12b are provided with the pressurizing magnets 16a, 16b, which apply prestress for the purpose of heightening the bearing rigidity of the Y air pads 15a, 15b, 15c, 15d. One end of each of the pressurizing magnets 16a, 16b is set to be flush with end faces of the grooves 17c, 17d, respectively, provided in the stage base 6, and the other ends thereof are set to be flush with the end face of the stage base 6. That is, areas (opposing areas) of the stage base 6 delimited by the grooves 17c, 17d and the end face of the stage base 6 oppose the pressurizing magnets 16a, 16b over identical widths.

If the Y sliders 12a, 12b merely move along the Y direction under these conditions, the pressurizing magnets 16a, 16b produce only a Z-direction attractive force with respect to the stage base 6. However, in a case in which the Y sliders 12a, 12b have moved (have been displaced) in the X direction, the pressurizing magnets 16a, 16b deviate from the opposing areas of the stage base 6. The portions of the pressurizing magnets 16a, 16b that have deviated produce an attractive force with respect to the stage base 6 along the X direction (the direction parallel to the guide surface), and this acts as a restoration force that offsets the deviation.

More specifically, when the areas of the stage base 6 delimited by the grooves 17c, 17d and the end face of the stage base 6 have been made to oppose the pressurizing magnets 16a, 16b over identical widths, as shown in FIG. 1B, a restoration force along the −X direction is produced when the Y guide 10 is displaced along the +X direction, and a restoration force along the +X direction is produced when the Y guide 10 is displaced along the −X direction. This indicates the acquisition of an effect similar to that obtained when the Y guide is adapted to be a direct-acting guide along the direction of the Y axis. The same is true also with regard to the Y direction of the X guide 9.

In accordance with the first embodiment, therefore, displacement of the X guide 9 and Y guide 10 in the longitudinal direction can be limited by providing the top side of the stage base 6 with the grooves 17a, 17b, 17c, 17d and without the provision of stationary guides. In other words, an X-direction direct-acting guide function for the X guide 9 and a Y-direction direct-acting guide function for the Y guide 10 can be implemented by the above-described arrangement.

In the description rendered above, the invention is described in regards to an embodiment in which the following holds:

(widths of X pressurizing magnets 14a, 14b or widths of Y pressurizing magnets 16a, 16b)= (widths of opposing areas of stage base 6), but similar effects are obtained also in a case in which the following holds:

(widths of X pressurizing magnets 14a, 14b or widths of Y pressurizing magnets 16a, 16b)> (widths of opposing ears of stage base 6).

That is, although a transverse attractive force is produced at portions of the Y pressurizing magnets 16a, 16b that protrude beyond the widths of the opposing areas of the stage base 6, usually, the force that acts upon the Y guide 10 along the direction of the X axis is zero because balance is maintained. However, if the Y guide 10 undergoes displacement along the X axis, an imbalance occurs in the transverse attractive force produced by the portions of the Y pressurizing magnets 16a, 16b that protrude beyond the widths of the opposing areas of the stage base 6. As a consequence, the imbalance acts as a restoration force that attempts to restore the Y guide 10 to the original in-balance position. More specifically, when the widths of the Y pressurizing magnets 16a, 16b are made greater than the opposing areas of the stage base 6 delimited by the grooves 17c, 17d and the end face of the stage base 6, a restoration force along the −X direction is produced when the Y guide 10 is displaced along the +X direction, and a restoration force along the +X direction is produced when the Y guide 10 is displaced along the −X direction. This indicates the acquisition of an effect similar to that obtained when the Y guide is adapted to be a direct-acting guide along the direction of the Y axis. The same is true also with regard to the Y direction of the X guide 9.

Thus, in accordance with the first embodiment as described above, it is possible to provide a bearing assembly and stage device in which displacement in a direction orthogonal to the direction of movement is limited without the provision of direct-acting guides.

Second Embodiment

Figure 2:
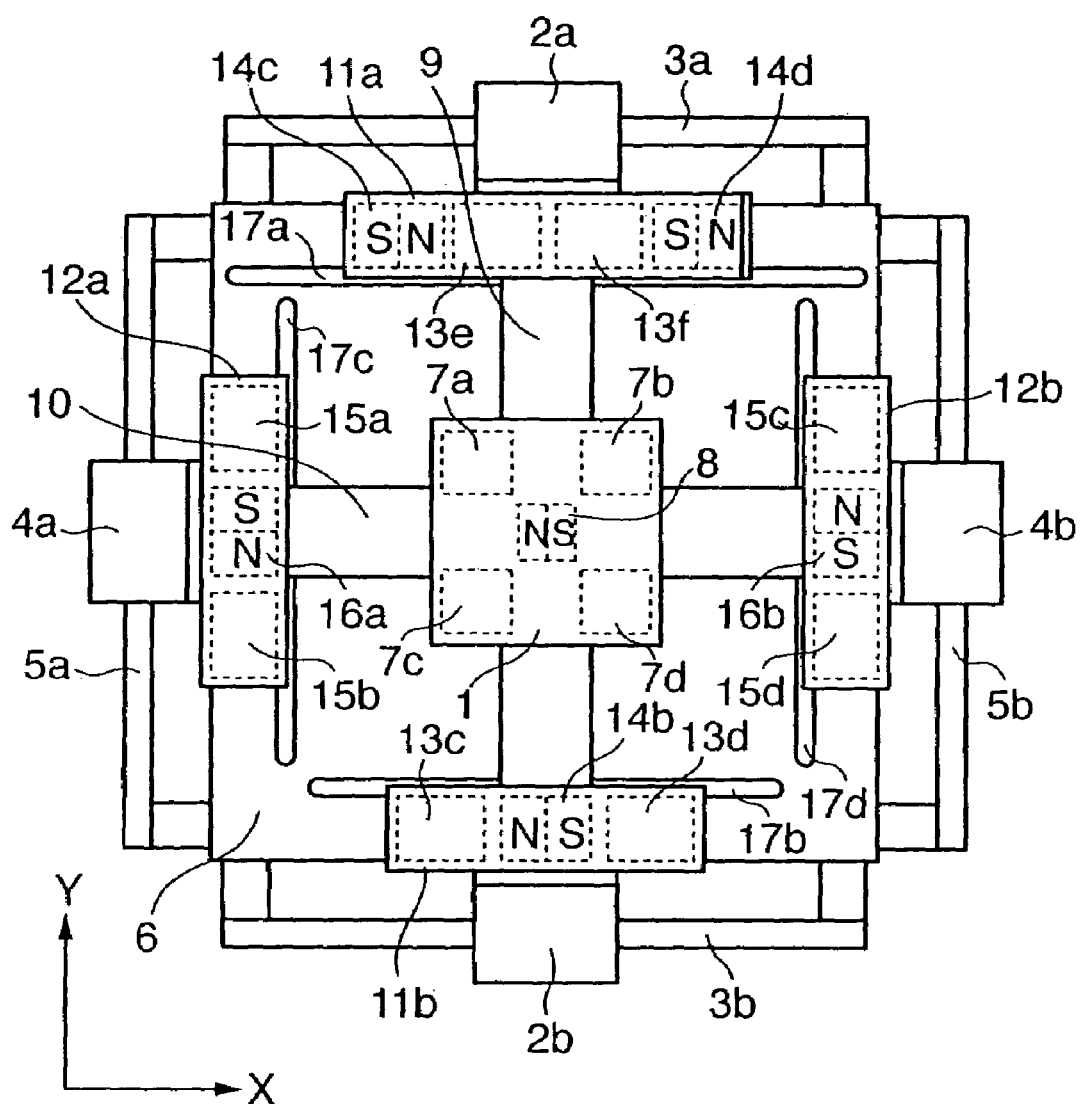
FIG. 2 is a diagram illustrating the structure of a stage device according to a second embodiment of the present invention.

FIG. 2 is a diagram illustrating a stage device according to a second embodiment of the present invention. The sectional view is similar to that of FIG. 1B and need not be shown again. Components in FIG. 2 identical with those of FIGS. 1A and 1B are designated by like reference characters.

The second embodiment differs from the first embodiment in the construction of the X air pads 13a, 13b and X pressurizing magnets 14a. That is, in FIG. 2, X air pads 13e, 13f are provided on the X slider 11, and X pressurizing magnets 14c, 14d are similarly provided on the X slider 11a. In the second embodiment, the two X pressurizing magnets 14c, 14d capable of regulating the position of the X slider 11a are provided and spaced apart at a predetermined distance. This is accompanied by disposing the X air pads 13e, 13f on the inner side of the X pressurizing magnets 14c, 14d and enlarging the dimensions of the X slider 11a and groove 17a.

By virtue of this arrangement, the X guide 9 is limited with respect to displacement in the direction of rotation about the Z axis. That is, in a case in which the X guide 9 has undergone displacement along the direction of the Y axis, a restoration force is produced through a principle the same as that of the first embodiment. Similarly, when the X guide 9 has undergone displacement in the direction of rotation about the Z axis, i.e., when so-called yawing has occurred, the X pressurizing magnets 14c, 14d deviate in mutually opposing directions from the opposing areas of the stage base 6. Consequently, an attractive force is produced in the transverse direction, and a rotation moment that acts so as to cancel displacement in the direction of rotation about the Z axis is produced. As a result, rotational displacement about the Z axis is limited at the same time that the X guide is adapted as a direct-acting guide along the direction of the X axis. This provides an effect similar to that obtained when a yawing guide is constructed.

At the same time, a limitation is imposed on the Y guide 10 with respect to displacement in the direction of rotation about the Z axis. That is, the reason for this is that the relative angle between the X guide 9 and the Y guide 10 is limited by the relative angle between the X transverse air pads 18a, 18b and Y transverse air pads (not shown). In other words, since the X guide 9, Y guide 10 and moving table 1 always act in unison and produce displacement in the direction of rotation about the Z axis, limitation of displacement of the X guide 9 in the direction of rotation becomes a limitation on displacement of the Y guide 10 in the direction of rotation.

Further, the second embodiment has been described in regards to an arrangement in which displacement in the direction of rotation about the Z axis is limited solely with respect to the X slider 11a. However, similar effects can be obtained even if use is made of a similar arrangement with respect to the Y slider 12a.

Furthermore, in the description rendered above, it is illustrated that overall displacement in the direction of rotation about the Z axis is limited if displacement in the direction of rotation about the Z axis is limited with regard to either X or Y. However, it may just as well be arranged so that limitation of displacement in the direction of rotation is applied to the X slider 11a and Y slider 12a simultaneously.

Further, as mentioned also in the first embodiment, it goes without saying that similar effects are obtained even if the following holds:

(widths of X pressurizing magnets 14a to 14d or
  widths of Y pressurizing magnets 16a, 16b)>
  (widths of opposing areas of stage base 6).

Thus, in accordance with the second embodiment, an effect similar to that obtained by providing a yawing guide can be obtained by providing permanent magnets (pressurizing magnets) on a moving body at a plurality of locations spaced apart along the direction of movement thereof.

Third Embodiment

Figure 3:
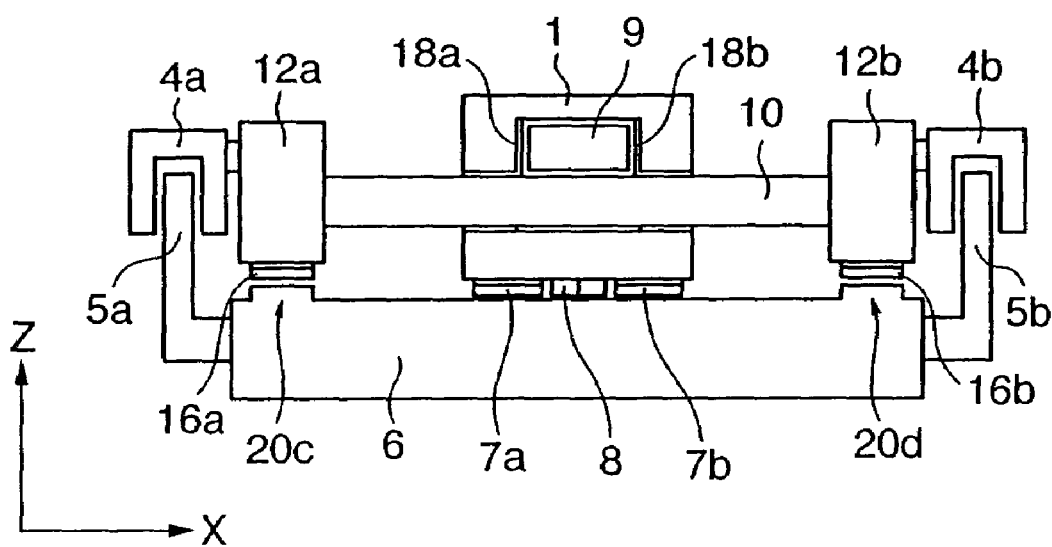
FIG. 3 is a diagram illustrating the structure of a stage device according to a third embodiment of the present invention.

FIG. 3 is a sectional view illustrating the structure of a stage device according to a third embodiment of the present invention. As shown in FIG. 3, the stage base 6 is provided with protrusions 20c, 20d. This embodiment is structurally similar to the first embodiment in other respects.

By forming the protrusions, the third embodiment defines opposing areas that oppose the pressurizing magnets 16a, 16b rather than providing the stage base 6 with a difference in level and defining opposing areas by the grooves 17a, 17b, 17c, 17d. That is, it is so arranged that the protrusions 20c, 20d serve as opposing areas that oppose the Y pressurizing magnets 16a, 16b, and the stage base 6 is provided with other protrusions (not shown) arranged to serve as opposing areas that oppose the X pressurizing magnets 14a, 14b.

Here it is so arranged that the following will hold:

(widths of X pressurizing magnets 14a, 14b or
  widths of Y pressurizing magnets 16a, 16b)=
  [widths of protrusions 20a, 20b or 20c, 20d
  (widths of opposing areas)].

Operation and effects in this case are similar to those of the first embodiment.

Further, effects similar to those mentioned in the first embodiment can be obtained also by arranging it so that the following holds:

(widths of X pressurizing magnets 14a, 14b or
  widths of Y pressurizing magnets 16a, 16b)>
  (widths of opposing areas of protrusions 20a,
  20b or 20c, 20d).

Thus, in accordance with the third embodiment, a guide (the stage base 6) is provided with protrusions that oppose permanent magnets (pressurizing magnets), and opposing areas in which the protrusions oppose the permanent magnets are made to serve as guide surfaces. As a result, effects similar to those of the first embodiment are obtained.

Fourth Embodiment

Figure 4:
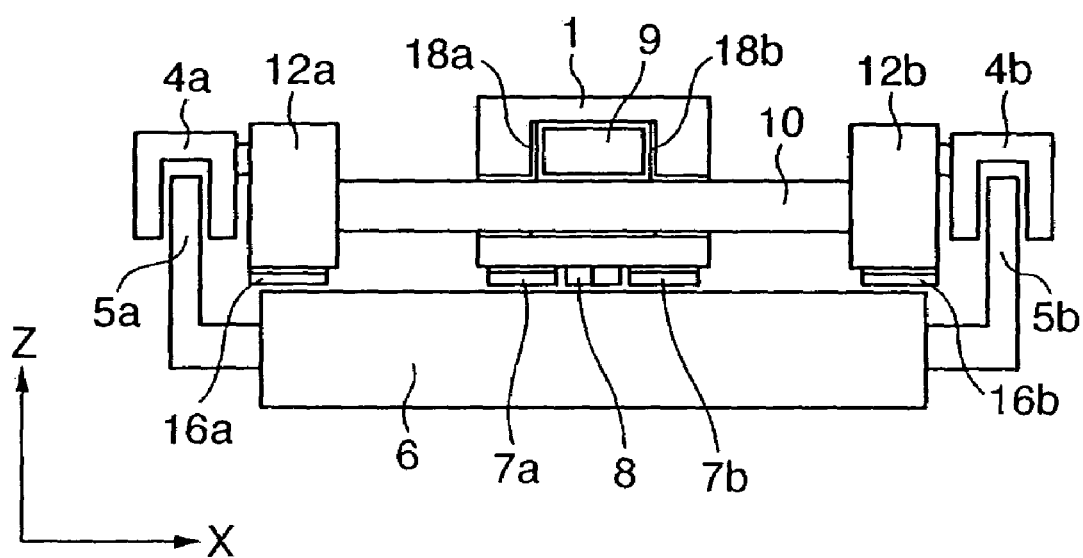
FIG. 4 is a diagram illustrating the structure of a stage device according to a fourth embodiment of the present invention.

FIG. 4 is a sectional view illustrating the structure of a stage device according to the fourth embodiment of the present invention. According to the fourth embodiment, the stage base 6 is not provided with grooves or protrusions of the kind mentioned in the first to third embodiments. Instead, as shown in FIG. 4, it is so arranged that the left end of the Y pressurizing magnet 16a is flush with or extends a prescribed amount beyond the left end of the stage base 6 and the right end of the Y pressurizing magnet 16b is flush with or extends a prescribed amount beyond the right end of the stage base 6. A similar structure is adopted with regard to the X guide, though this is not shown in FIG. 4.

As a result of the above arrangement, effects similar to those of the first embodiment are obtained. In this case, a restoration force using a transverse attractive force of the pressurizing magnets is made half that of the first embodiment in order that it will be used only on the one side. However, the structure is simplified as a provision of grooves or protrusions is unnecessary.

Fifth Embodiment

Figure 5:
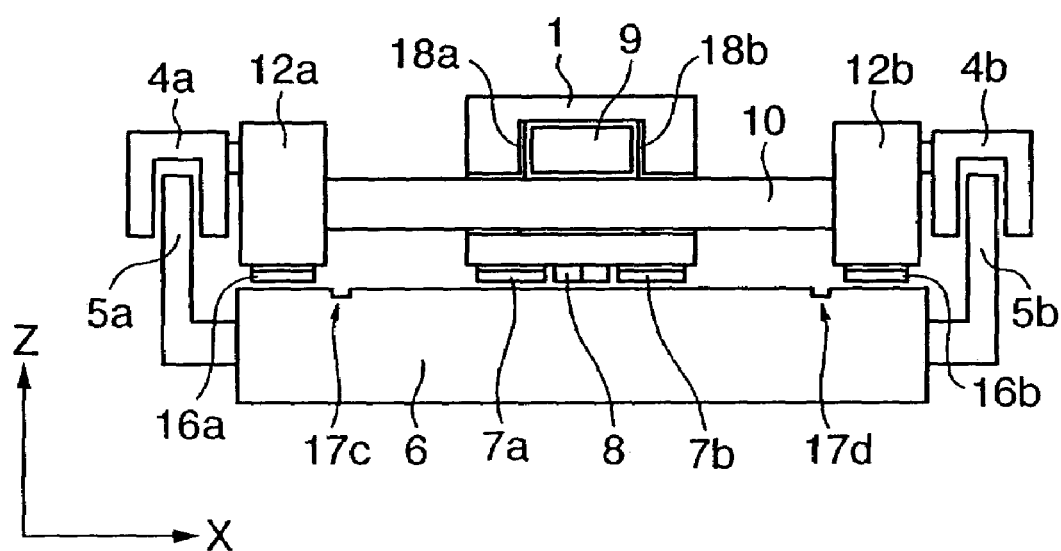
FIG. 5 is a diagram illustrating the structure of a stage device according to a fifth embodiment of the present invention.

FIG. 5 is a sectional view illustrating the structure of a stage device according to a fifth embodiment of the present invention. The fifth embodiment is an example in which the transverse restoration force of the pressurizing magnets is used as a fluctuation limiting function instead of direct-acting guide of the X and Y guides.

In the first embodiment, it is arranged so that the following holds:

(widths of X pressurizing magnets 14a, 14b or
  widths of Y pressurizing magnets 16a, 16b)≧
  (widths of opposing areas of stage base 6).

In the fifth embodiment, however, it is so arranged that the following holds:

(width of X pressurizing magnets 14a, 14b or widths of Y pressurizing magnets 16a, 16b)<(widths of opposing areas of the stage base 6).

Even if the XY coordinates of the moving table 1 and displacement in the direction of rotation about the Z axis are uniquely decided by controlling thrust of the linear motors, displacement of the X guide 9 along the Y direction and displacement of the Y guide 10 along the X direction are not uniquely determined, as described earlier. In other words, this means that even though there is a displacement of the X guide 9 along the Y direction or displacement of the Y guide 10 along the X direction, there is not a direct influence upon the XY coordinates of the moving table 1 and displacement in the direction of rotation about the Z axis. Owing to this displacement, however, interference is produced between the stator and movable element of the linear motor, parasitic vibration is produced at the time of drive, thereby lowering positioning accuracy, and measurement precision declines. This has made direct-acting guides of some kind necessary, as described earlier.

However, as long as interference of nearby members does not occur, there are cases in which displacement of the X guide 9 along the Y direction and displacement of the Y guide 10 along the X direction are allowable, as in a device in which only very low-speed drive is performed or a device in which only coarse positioning accuracy is required. In such cases, a direct-acting guide is not necessarily required. Even in these cases, however, interference should be avoided and, therefore, a fluctuation limiting function is required. Accordingly, in the fifth embodiment, it is arranged so that the restoration force will not act until the end faces of the pressurizing magnets reach the end faces of the opposing areas of the stage base 6, i.e., so that the restoration force will begin to act only when both end faces become flush.

In accordance with the fifth embodiment, the X guide 9 can be displaced along the Y direction and the Y guide 10 along the X direction within a prescribed allowable range. However, displacement in excess of this range is limited owing to the action of the restoration force of the pressurizing magnets, as described in the first embodiment.

It should be noted that, although the stage base 6 is provided with the grooves 17a, 17b, 17c, 17d, as in the first embodiment, similar effects can be obtained even if protrusions are provided, as in the third embodiment, or even if both ends of the stage base 6 are used, as in the fourth embodiment (in the latter case, the pressurizing magnets would be placed at prescribed distances from both ends of the stage base 6).

Sixth Embodiment

Figure 6:
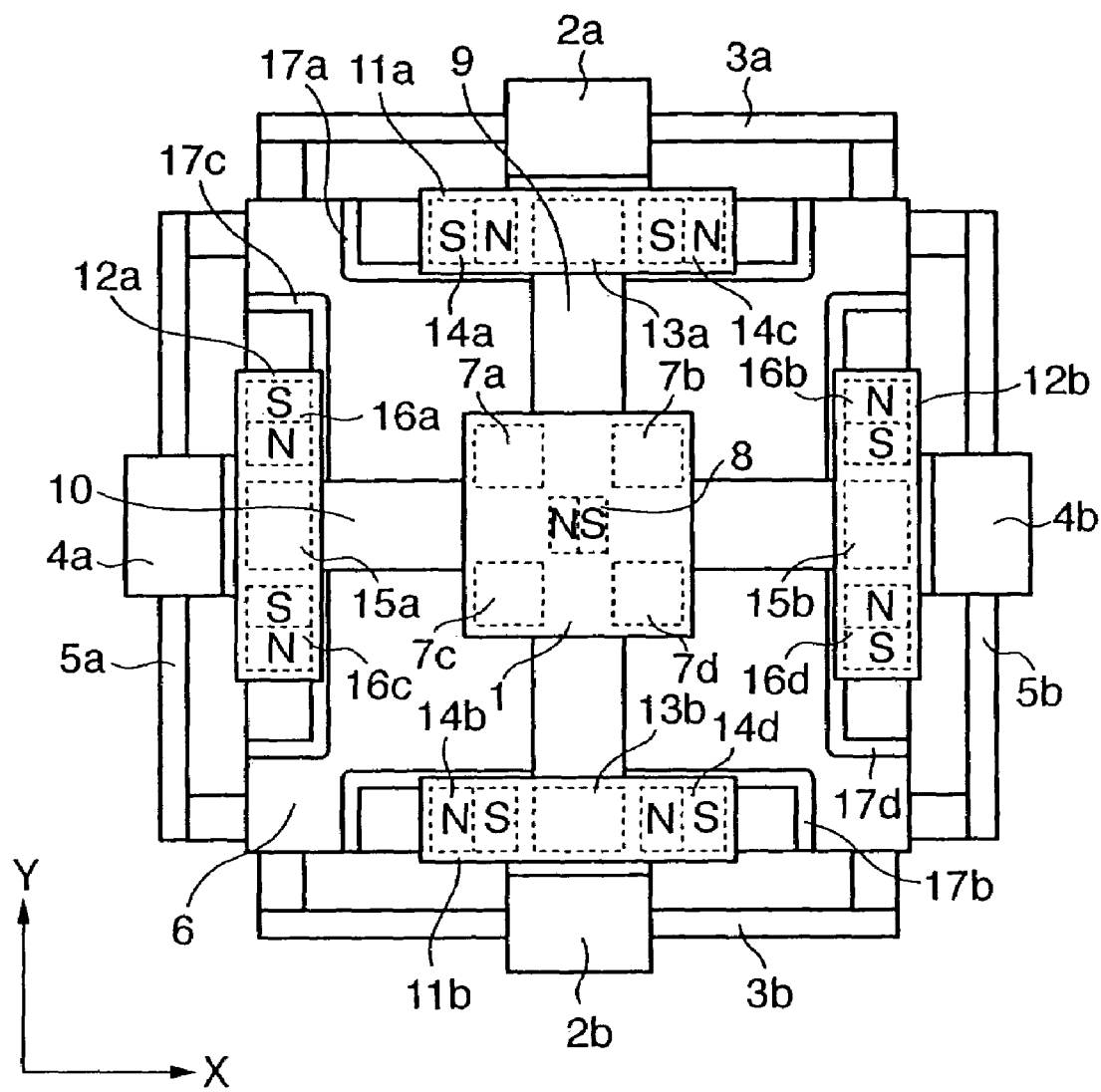
FIG. 6 is a diagram illustrating the structure of a stage device according to a sixth embodiment of the present invention.

FIG. 6 is a plan view illustrating a stage device according to a sixth embodiment of the present invention. The sixth embodiment is an example in which the transverse restoration force of the pressurizing magnets is used not only as a direct-acting guide of the X and Y guides, but also as a stroke-limit function.

Here, the placement of the X air pads 13a, 13b, 13c, 13d and X pressurizing magnets 14a, 14b is made the opposite of that of the first embodiment, the X pressurizing magnets 14a, 14c and 14b, 14d are disposed on the outer side, and the X air pads 13a and 13b are disposed on the inner side. Similarly, the placement of the X air pads 15a, 15b, 15c, 15d and Y pressurizing magnets 16a, 16b is made the opposite of that of the first embodiment, the Y pressurizing magnets 16a, 16c and 16b, 16d are disposed on the outer side, and the X air pads 15a and 15b are disposed on the inner side.

The generation of the restoration force with regard to displacement of the X guide 9 along the direction of the Y axis and displacement of the Y guide 10 along the direction of the X axis is as set forth in the first embodiment. This arrangement is such that when X sliders 11a, 11b move along the X direction, the X pressurizing magnets 14a, 14b, 14c, 14d generate an attractive force only along the direction of the Z axis if movement falls within a predetermined stroke range (i.e., the stroke through which the moving table 1 moves along the X direction). If movement exceeds this range, however, the transverse attractive force of the X pressurizing magnets 14a, 14b, 14c, 14d acts as a force to restore movement to the limits of the stroke range owing to the grooves 17a, 17b provided in the stage base 6. The same holds true for the Y guide 10. As a result, it is possible to dispense with a mechanical stopper such as a shock absorber provided in the prior art in order to limit operation that exceeds the stroke.

It should be noted that the stage base 6 is provided with the grooves 17a, 17b, 17c, 17d as in the first embodiment. However, in a case in which the stage base 6 is provided with protrusions, as in the third embodiment, similar effects can be obtained. In this case, the end portions of these protrusions serve as movement limiters. Alternatively, similar effects can be obtained by using both ends of the stage base 6.

Thus, in accordance with the sixth embodiment, the size of a guide surface and the placement of the permanent magnets are limited for the purpose of limiting the amount of displacement of a slider in the direction of movement. As a result, the effect of a limiting function is obtained in addition to a guiding function when the table moves through its stroke.

Seventh Embodiment

Figure 7A:
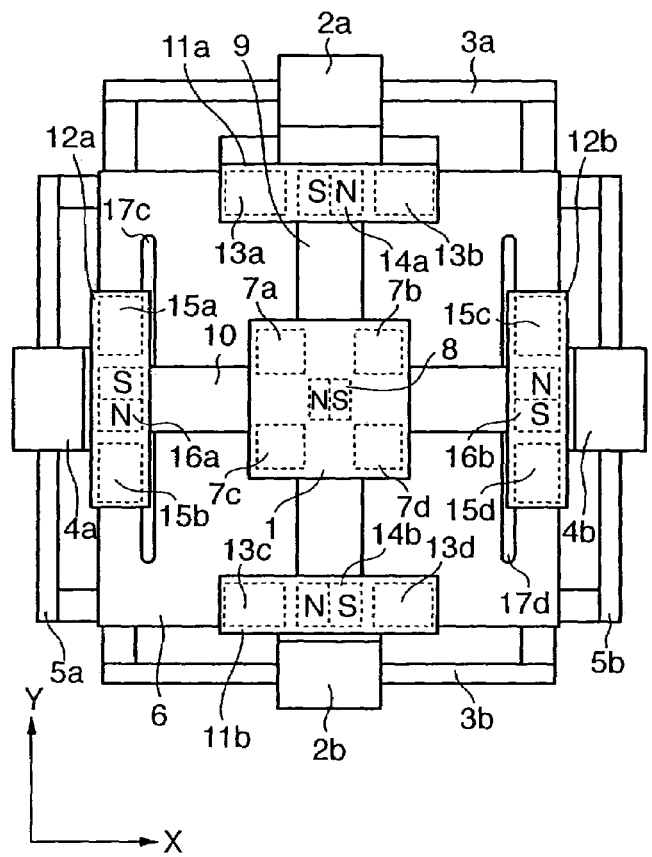
FIGS. 7A to 7C are diagrams illustrating the structure of a stage device according to a seventh embodiment of the present invention.
Figure 7B:
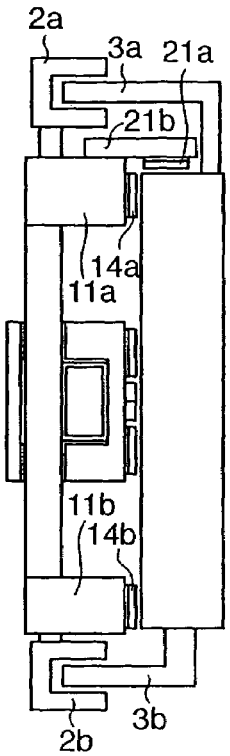
Figure 7C:
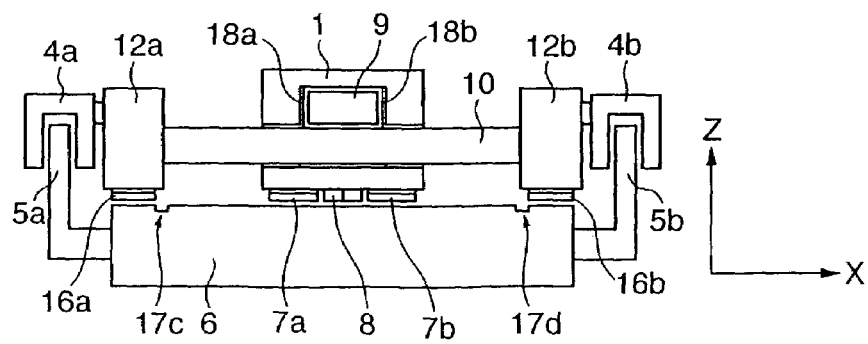
Figure 8A:
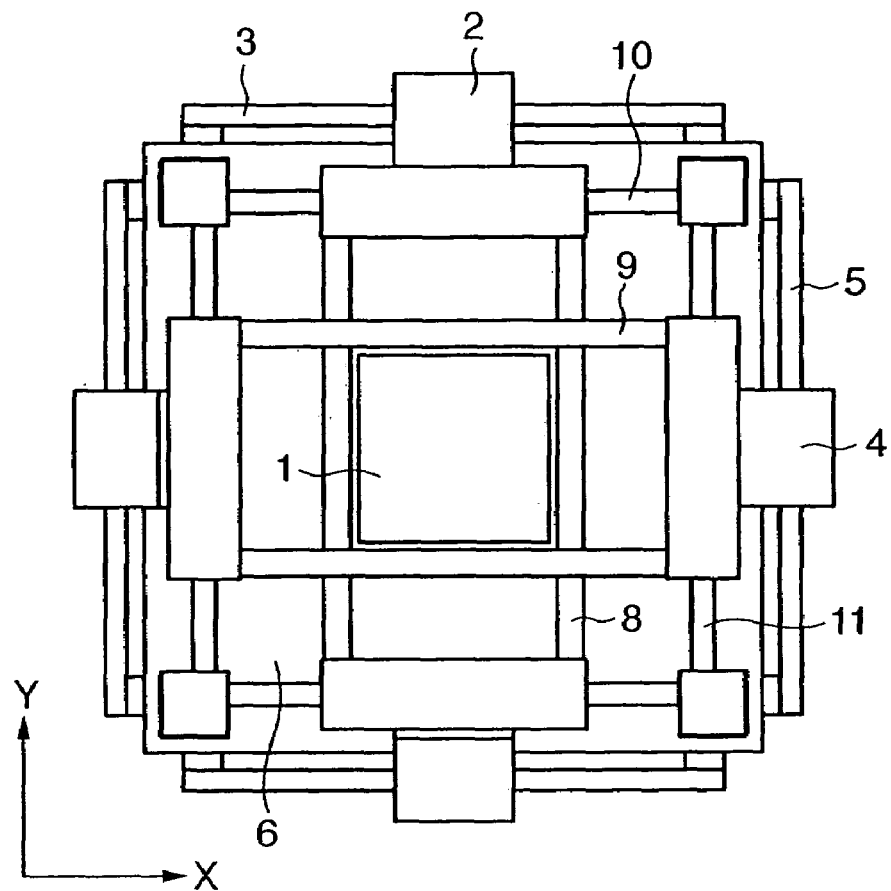
FIGS. 8A to 8B are diagrams illustrating the structure of an ordinary stage device.
Figure 8B:
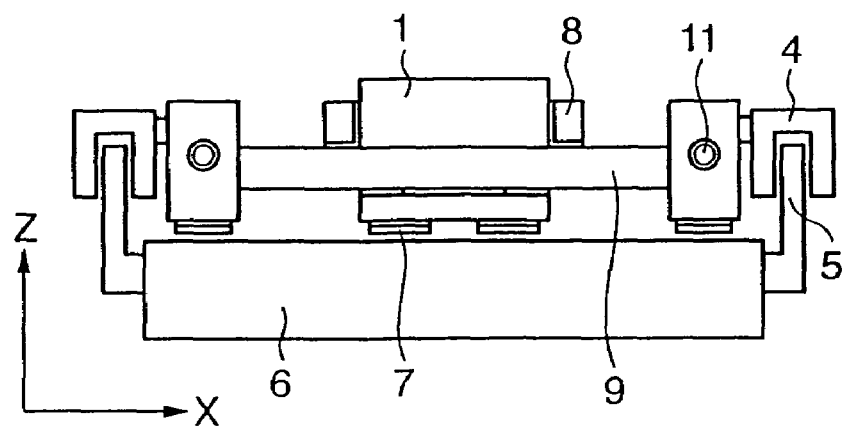

FIGS. 7A to 7C are diagrams illustrating a stage device according to a seventh embodiment, in which FIG. 7A is a plan view and FIGS. 7B, 7C are sectional views. The seventh embodiment is an example in which the transverse restoration force of the pressurizing magnets is used as a direct-acting guide of the Y guide, while a hydrostatic bearing is used as a direct-acting guide of the X guide.

More specifically, in FIG. 7B, a transverse pad 21a has the side face of the stage base as a guide surface, and a transverse-pad holding member 21b is fastened to the X slider 11a. The transverse pad 21a is disposed at least at two locations spaced away from each other in the direction of movement. Movement of the X guide 9 and X sliders 11a, 11b along the direction of the Y axis and rotation about the X axis are regulated by the guiding of the transverse pads 21a.

By virtue of this arrangement, regulation of the moving table 1 in the direction of rotation about the Z axis is performed by the transverse pad 21a. As a result, the natural frequency is high. Another advantage is that since the transverse restoration force of the pressurizing magnets is used to regulate the Y guide 10 along the direction of the X axis, an excessive constraining force is not applied.

It should be noted that the first to seventh embodiments have been described in regards to examples in which air bearings are used as contactless guides of each of the components, such as the moving table. However, similar effects are obtained even if use is made of static-pressure hydrostatic bearings that utilize a magnet levitating force or an attractive force.

In accordance with the first to seventh embodiments, as described above, displacement in a direction parallel to the guide surface of a moving body can be limited by limiting an area of the guide surface that opposes a pressurizing magnet by means of such grooves provided in the guide. As a result, it is possible to realize a bearing assembly that does not require stationary guides, occupies little space, is low in cost and easy to assemble.

Further, in accordance with the sixth embodiment in particular, it is possible to simultaneously dispense with mechanical stoppers such as shock absorbers.

Figure 10:
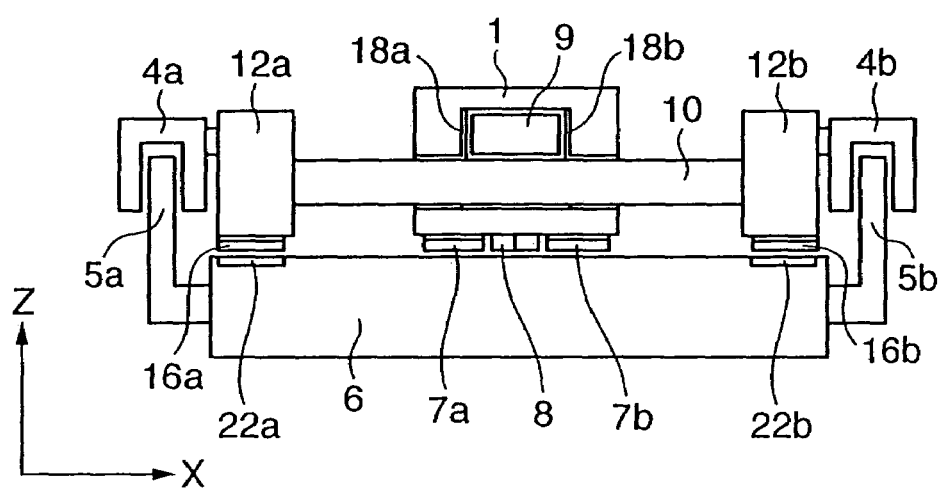
FIG. 10 is a diagram illustrating a modification of the first embodiment.

Further, in each of the above-described embodiments, the guide portions on the stage base 6, which is a magnetic body, are defined using grooves and the edge of the stage base or protrusions. However, a stage base that is not a magnetic body may be provided with a guide plate that is a magnetic body. For example, in FIG. 3, the stage base 6 may be made a non-magnetic body and the protrusions 20*c*, 20*d* may be formed from magnetic bodies. Alternatively, as shown in FIG. 10, the guide portions on the stage base 6 may be provided with recesses and non-magnetic bodies 22*a*, 22*b* may be embedded within these recesses.

Furthermore, though permanent magnets are used as the pressurizing magnets in each of the foregoing embodiments, electromagnets may also be used.

Eighth Embodiment

An example in which a stage device according to each of the foregoing embodiments is applied to an exposure apparatus will be described in regards to a demagnifying projection exposure apparatus.

Figure 9:
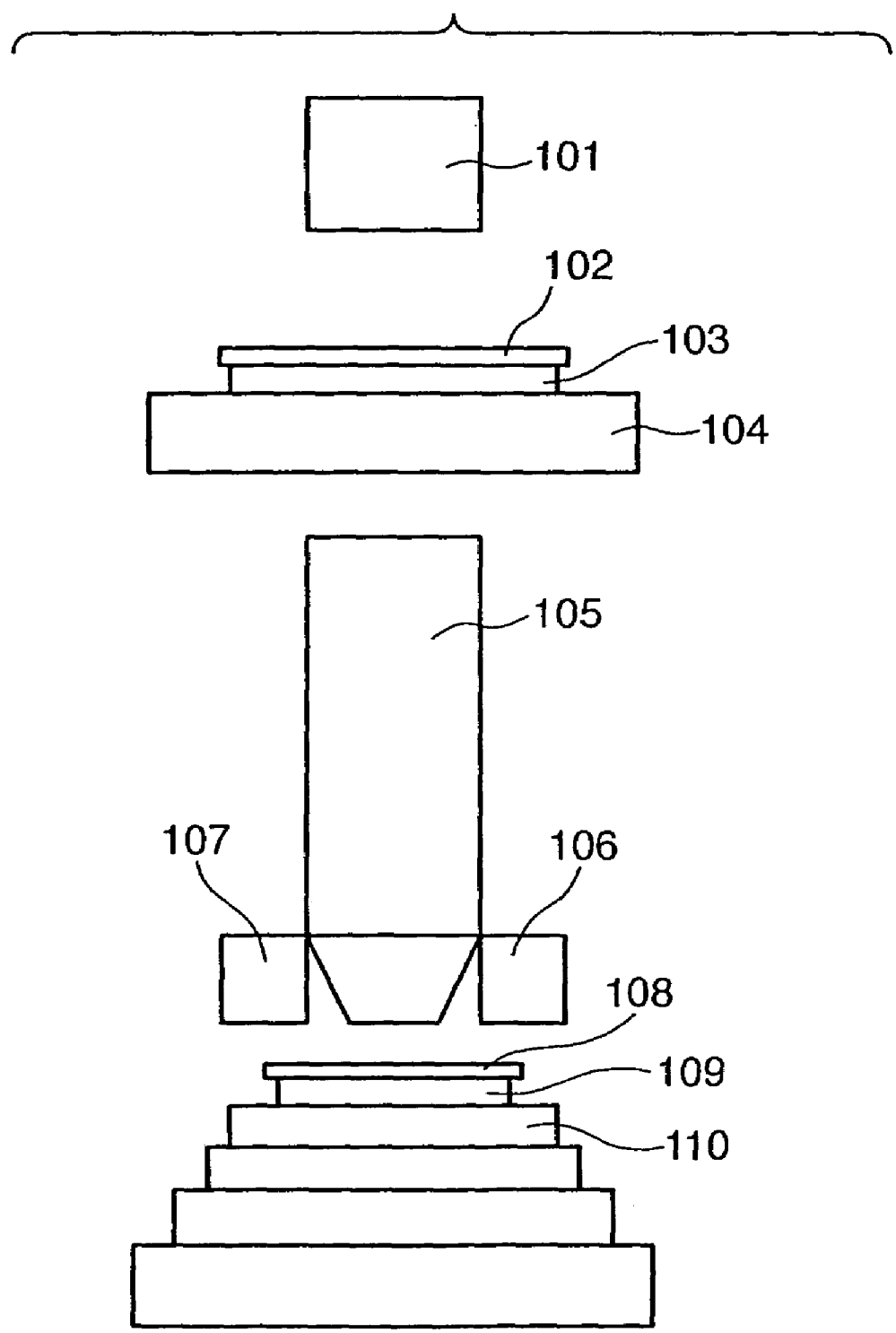
FIG. 9 is a diagram illustrating the general structure of an exposure apparatus according to an eighth embodiment of the present invention.

FIG. 9 is an overall schematic view of an exposure apparatus according to an eighth embodiment. As shown in FIG. 9, the exposure apparatus is such that a reticle 102, which is an exposure master plate, is placed on a reticle stage 104 via a reticle chuck 103. The reticle 102 is irradiated with exposing light guided to it from a light source (not shown) via an illuminating optical system 101. The exposing light that has passed through the reticle 102 is demagnified to, e.g., one-fifth the size by a projection optical system 105 and illuminates a silicon wafer 108, which is the workpiece. A so-called wafer chuck 109, namely, a substrate holding device serving as a means for holding the silicon wafer 108, is mounted on an XY stage 110 that is capable of moving the wafer in a horizontal plane. A stage device described in the first to seventh embodiments is used as the XY stage 110.

An example of an exposure sequence in the exposure apparatus constructed as set forth above will now be described.

Once the silicon wafer 108 to be exposed has been set in the exposure apparatus automatically or manually by an operator, operation of the exposure apparatus starts in response to an exposure-start command. A first wafer 108 is fed into the wafer chuck 109, which has been mounted on the stage 110, by a conveyance system. Next, alignment marks inscribed on the wafer 108 are detected at a plurality of locations by an off-axis scope 107, wafer magnification, rotation and amount of XY shift are determined and position is corrected. The stage 110 moves the wafer in such a manner that a first shot position of the mounted wafer will agree with the exposure position of the exposure apparatus. After focusing is achieved by surface measurement means 106, exposure is carried out for about 0.2 s, the wafer is stepped to a second shot position on the wafer and exposure is repeated in succession. Processing for exposure of one wafer is completed by repeating a similar sequence up to the final shot. The wafer delivered from the wafer chuck to a recovery transport hand is returned to a wafer carrier.

In accordance with the present invention, as described above, a bearing device that does not require stationary guides is provided, troublesome adjustments are eliminated and cost can be reduced.

As many apparently widely different embodiments of the present invention can be made without departing from the spirit and scope thereof, it is to be understood that the invention is not limited to the specific embodiments thereof except as defined in the appended claims.

What is claimed is:

1. A stage apparatus comprising:
   a base having a guiding surface, wherein a magnetic portion is provided in a part of said guiding surface;
   a moving body capable of moving in a first direction and a second direction orthogonal to the first direction along said guiding surface;
   a first movable guide, including a beam extending along the first direction, configured to guide said moving body in the first direction and to move said moving body in the second direction;
   a first magnet arranged on said first movable guide opposing said magnetic portion;
   means for defining an end of the magnetic portion that opposes said first magnet; and
   a first air bearing configured to apply a floating force to said first movable guide,
   wherein movement of said first movable guide in the first direction is limited by a magnetic attractive force between the magnetic portion and said first magnet, and said magnetic attractive force provides said first movable guide with a preload against said first air bearing, whose direction is opposite to the floating force.

2. The apparatus according to claim 1, wherein said means for defining the end is a groove formed on the base.

3. The apparatus according to claim 1, further comprising:
   a second movable guide, including a beam extending along the second direction, configured to guide said moving body in the second direction and to move said moving body in the first direction;
   a second magnet arranged on said second movable guide opposing the magnetic portion;
   means for defining an end of the magnetic portion that opposes said second magnet; and
   a second air bearing configured to apply a floating force to said first movable guide,
   wherein movement of said second movable guide in the second direction is limited by a magnetic attractive force between the magnetic portion and said second magnet, and said magnetic attractive force provides said second movable guide with a preload against said second air bearing, whose direction is opposite to the floating force.

4. An exposure apparatus comprising:
   a projection optical system configured to project a pattern on a master plate onto a substrate; and
   a stage apparatus, which is set forth in claim 1, for moving at least one of the master plate and the substrate.

5. A method of producing a device, said method comprising the steps of:
   processing a wafer using the exposure apparatus according to claim 4; and
   assembling the wafer processed in the processing step into the device.

* * * * *